United States Patent [19]

Neuerburg

[11] 4,343,138
[45] Aug. 10, 1982

[54] SUPPORTING STRUCTURE FOR AN AGRICULTURAL MACHINE

[75] Inventor: Horst Neuerburg, Haegen, France

[73] Assignee: Kuhn S.A., Saverne, France

[21] Appl. No.: 158,257

[22] Filed: Jun. 10, 1980

[30] Foreign Application Priority Data

Jun. 19, 1979 [FR] France ............................... 79 16486

[51] Int. Cl.³ ............................................ A01D 35/14
[52] U.S. Cl. ............................... 56/15.9; 56/DIG. 10; 56/228
[58] Field of Search ...................... 56/14.9, 15.9, 16.3, 56/15.7, 15.8, 228, DIG. 10

[56] References Cited

U.S. PATENT DOCUMENTS 4,162,606  7/1979  Weichel ............................... 56/15.9

FOREIGN PATENT DOCUMENTS 2722883 11/1978 Fed. Rep. of Germany ....... 56/15.9
7135523  5/1972 France ................................. 56/15.9

Primary Examiner—Robert A. Hafer
Attorney, Agent, or Firm—Ernest F. Marmorek

[57] ABSTRACT

A supporting structure for an agricultural machine which may be connected to a movable vehicle includes a first frame adapted to be connected to the vehicle, a second frame adapted to be connected to the agricultural machine, an articulation device including a pivotable parallelogram mechanism connected to the frames, and permitting movement therebetween, and restraining devices limiting the movement between the frames.

6 Claims, 4 Drawing Figures

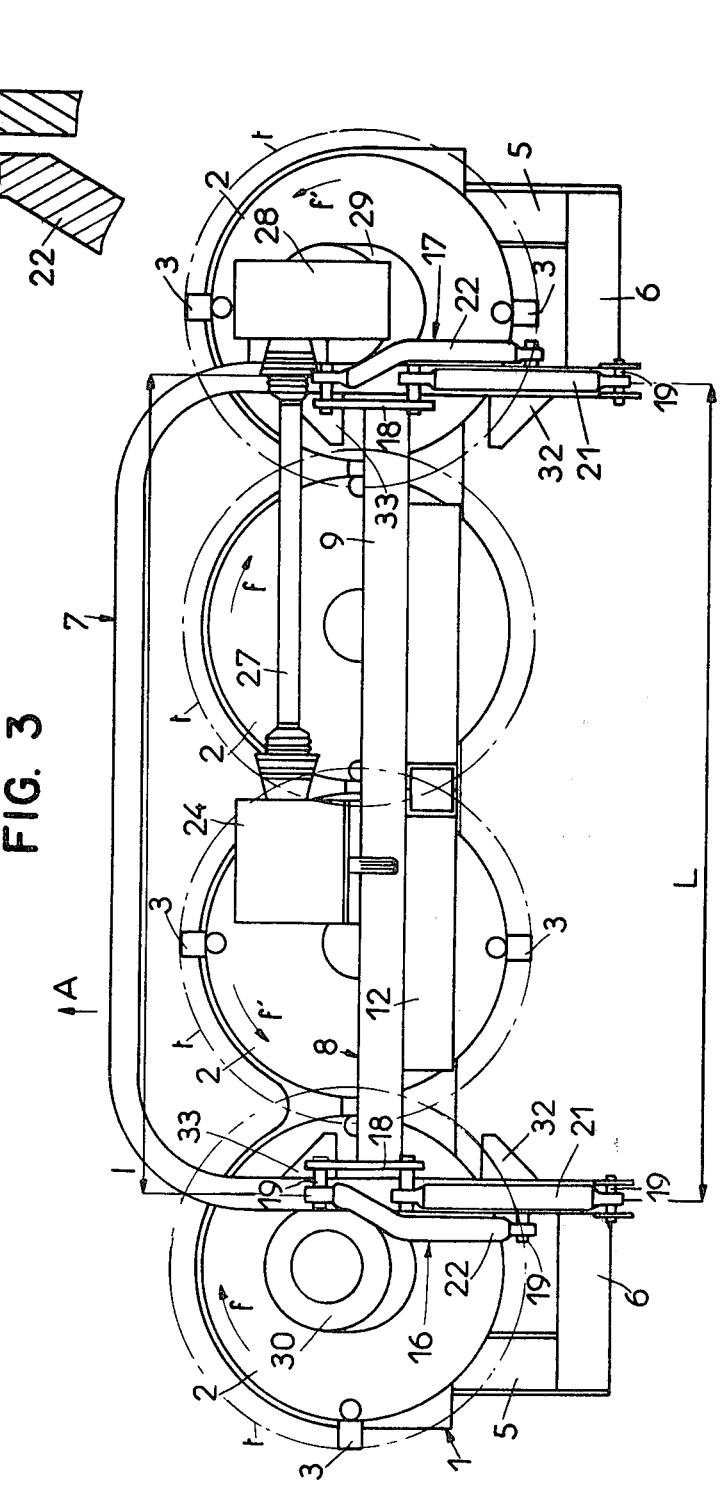

SUPPORTING STRUCTURE FOR AN AGRICULTURAL MACHINE

BACKGROUND OF THE INVENTION

It is known that it is advantageous to connect an agricultural machine, especially a mower, to the front of a movable vehicle, such as a tractor. This allows any cut agricultural products, such as fodder, to pass between the wheels of the tractor, and also permits another machine to be connected to the rear of the tractor in a conventional fashion, with the result, that the tractor's mowing capacity is increased, time is saved, and its fuel consumption is reduced.

However certain regulations must be observed when connecting a machine to the front of a tractor. In fact, certain traffic legislation stipulates a maximum distance between the driver's place on the tractor, and the forward extremity of a machine connected to the front of a tractor. The object of this measure is to ensure good visibility when driving, particularly at road junctions.

Furthermore, when an agricultural machine is connected to the front of a tractor, it is advantageous for the machine to be located as close to the front wheels of the tractor as possible. The shorter the distance between the machine and the front wheels of the tractor, the easier it is for the machine to follow any unevennesses of the terrain.

The problem of causing a machine connected to the front of a tractor to follow the terrain is solved effectively by the use of a linking system of pivotable parallelogram means connected between the machine and attachment hooks or the like of the tractor.

A linking system of this type incorporating pivotable parallelogram means, whose bars are connected to a machine by means of cylindrical articulating devices and the pivotable bolts of which are horizontal, and extend at right angles to the direction of advance of the tractor, has a number of disadvantages.

In fact, the bars of the parallelograms extending towards the front and downwardly, as seen in the direction of advance of the machine, are connected to the machine at their lower ends, while their upper ends are connected to the attachment hooks or the like of the tractor. This method of connection increases the distance between the machine connection side of the tractor, and the forward part of the machine. Moreover, since the bars of the parallelograms are articulated or pivoted on cylindrical shafts, the machine connected to these bars is restrained to move only in a vertical plane within the movement restraints of the pivotable parallelogram mechanism.

As a result, in the event one end of the machine strikes an obstacle, while the machine is in its operative position, the entire machine will be lifted, maintaining its attitude within the constraints of the pivotable parallelogram mechanism, when passing over the obstacle. Thus, in the case of a mower connected to the front of a tractor, the grass or the fodder will not be cut as closely over the entire width of the machine. Whenever the machine passes over an obstacle, a swath of grass will remain, extending over the entire width of the machine, thus constituting a certain loss of the expected harvest, quite apart from the additional disadvantage of hindering fresh growth of the crop.

Furthermore, when the machine is lifted, it generally moves forwardly along an arc of a circle. But, when the machine encounters an obstacle, it should be lifted and move forwardly, even though the obstacle impedes this desired forward movement.

Finally, the aforedescribed connecting device has the drawback of stressing the cylindrical articulating means of the bars of the parallelograms to a considerable extent. These stresses occur principally when a change in the direction of motion is made, with the machine connected in its operable position to the tractor, which in turn, makes it necessary to use relatively large articulating means, which increases the weight and cost of the machine.

SUMMARY OF THE INVENTION

One of the principal objects of the present invention is to eliminate the previously mentioned drawbacks, as it relates to a supporting structure allowing an agricultural machine, for example, of the mower type, to be connected to the front of a tractor as close as possible to its front wheels, and to be lifted solely in the area where it encounters an obstacle, executing a rearward evasive movement in the process. It is thus possible to use machines of considerable operating width without the risk of forming a swath of grass remaining and extending over the entire cutting width of the machine. Moreover, the supporting structure of the present invention makes it possible to relieve the articulating means of the parallelogram mechanism of the strains to which they are subjected, when changes in the direction of movement are made, with the machine in its operating position.

In the present invention the cylindrical articulating means connecting the bars of the parallelograms have been replaced by spherical articulating means allowing the machine to move relative to the attachment hooks of the tractor, notably in planes parallel and at right angles to the direction of advance of the machine. These spherical articulating means must also allow the machine to at least temporarily come to a stop in relation to the connecting hooks of the tractor, when the machine has moved a certain amount. This is necessary, in particular, when the machine is required to make a turn.

This object is attained, according to the invention, by providing a supporting structure for an agricultural machine which may be connected to a movable vehicle, which includes a first frame adapted to be connected to the vehicle, a second frame adapted to be connected to the agricultural machine, articulation means including pivotable parallelogram means connected to the frames, and permitting movement therebetween, and restraining means limiting the movement between the frames.

The restraining means preferably include portions of the frames arranged to block the path of each other; one frame is advantageously disposed at least partially within the confines of the other. This makes it possible, in spite of the presence of the parallelogram means, to position the machine relatively close to the front wheels of the tractor, and thus to reduce the bulk of the supporting structure in accordance with the present invention.

The first frame is advantageously U-shaped, and is preferably at least partially disposed within the confines of the second frame.

Each frame advantageously defines substantially a dominant plane, and the dominant planes are substantially perpendicular to one another; the first frame preferably defines substantially a vertical plane, and the second frame preferably defines substantially a horizontal plane in the operative positions of the frames, respectively.

The second frame is advantageously connected to the first frame, and is adapted to be connected to the agricultural machine in such a manner that the first frame is disposed throughout at least its major extent above the active portions of the agricultural machine.

The pivotable parallelogram means preferably include two oppositely disposed pivotable parallelogram mechanisms, each having four pivotable joints, and wherein two pivotable joints of each parallelogram mechanism are connected to one frame, and the remaining two to the other frame; at least some of the pivotable joints of the oppositely disposed parallelogram mechanisms are preferably connected to the one frame and spaced from one another at a distance exceeding the spacing of at least some of the pivotable joints of the oppositely disposed parallelogram mechanism connected to the other frame. The pivotable joints are preferably spherical joints. Thus the machine may follow any unevennesses of the terrain closely while being, for example, lifted only at one of its ends. However, these various movements do not place any strain on the spherical articulating means, since the movements are limited by the two frames including portions arranged to block the path of each other.

Further objects and advantages of the invention will be set forth in part in the following specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings, in which:

FIG. 3 is a plan view of the machine shown in FIGS. 1 and 2, as seen from above, and FIG. 4 is a partial enlarged sectional view along the line IV—IV of FIG. 1.

DESCRIPTION OF THE PREFERRED EMBODIMENTS

Figure 1:
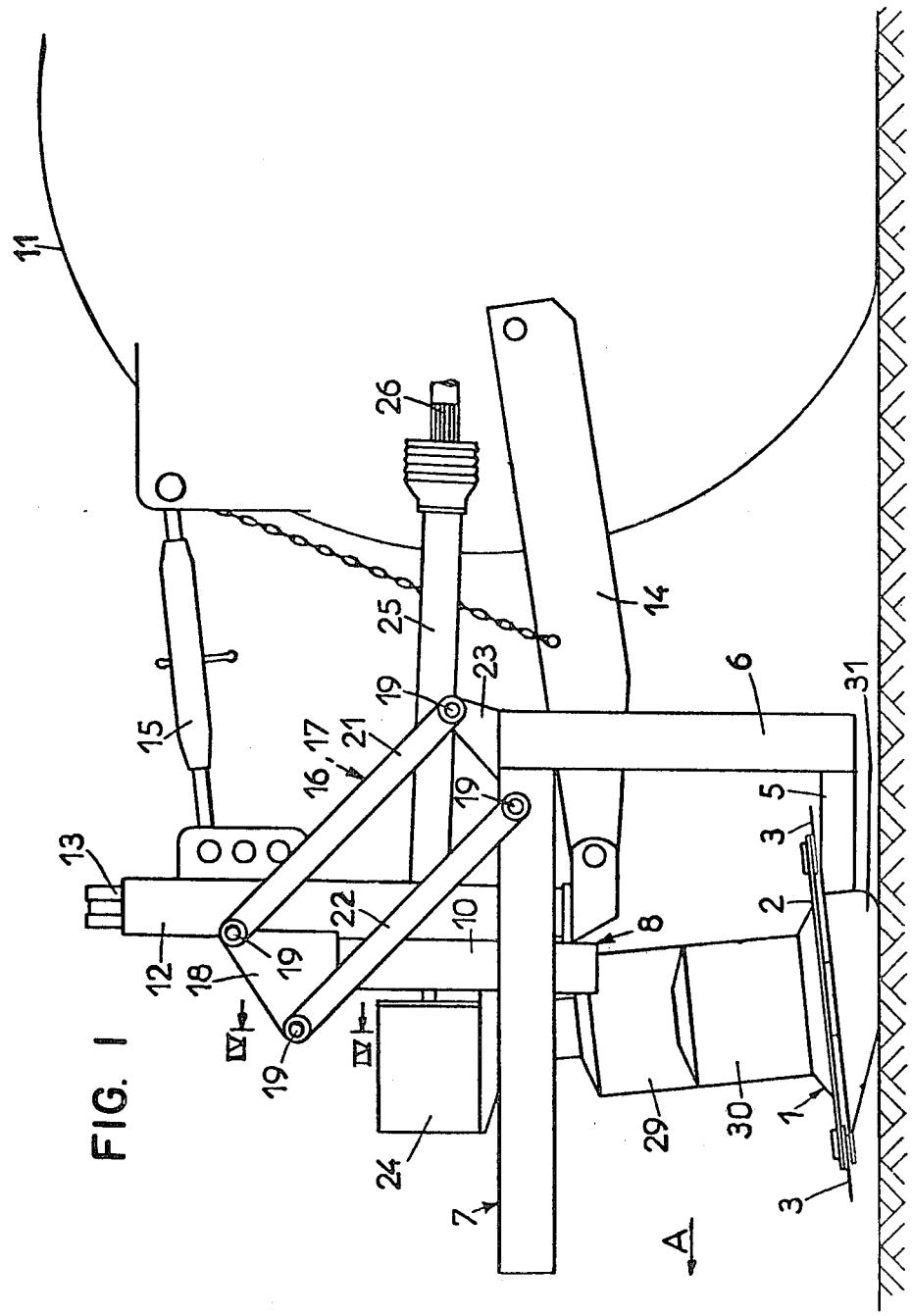
FIG. 1 is a side view of a machine connected to the front of a tractor by means of the supporting structure in accordance with the present invention.

Referring now to the drawings, a machine equipped in accordance with the present invention includes a cutter bar 1 fitted with four disks 2, each provided with two cutters 3 which are disposed diametrically opposite one another. The disks 2 are made to rotate in the direction of the arrows f and f′ with the aid of transmission means, such as a series of pinions meshing with one another, and housed in the casing 4 of the cutter bar 1.

Figure 2:
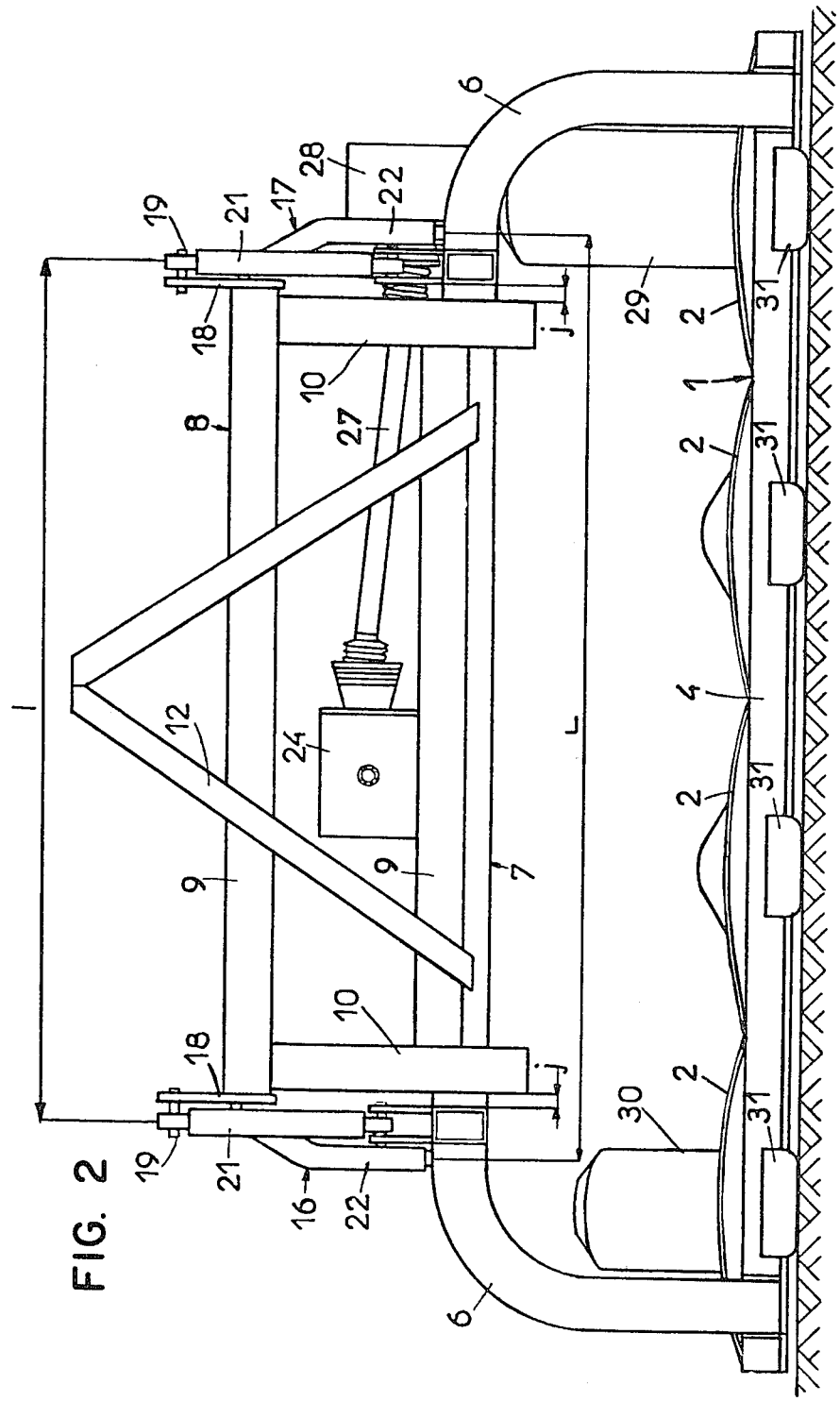
FIG. 2 is a rear view of the machine shown in FIG. 1.

Two supports 5 secured to the ends of the casing 4 extend towards the rear beyond the locus or path t followed by the cutters 3, when the disks 2 are rotated. Arms 6 which have substantially the shape of an inverted L, as best seen in FIG. 2, extend in a substantially vertical plane. The arms 6 are welded onto the supports 5 and extend upwardly facing one another. A U-shaped frame 7, best seen in FIG. 3, is joined to the free ends of the arms 6. The frame 7, open to the rear, extends in a substantially horizontal plane, such that its front part, viewed in the direction of advance A of the machine, is located above, and ahead of the circular path t followed by the cutters 3 secured to the disks 2.

Within the confines of the horizontal U-shaped frame 7 there is disposed a second frame 8 which has a substantially rectangular shape, and extends substantially in a vertical direction, and at right angles to the direction of advance A of the machine. The frame 8 consists of one or two tubes 9 disposed substantially horizontally, and welded to two side members 10 disposed substantially vertically; the side members 10 extend near both sides of the tube or tubes 9, and are disposed substantially within the confines of the U-shaped frame 7, whose two side elements, or arms 6, are separated by an amount slightly greater than the length of the frame 8.

Secured to the frame 8 there is a device for being hooked to a tractor, of which only the outline of its front wheel 11 is shown in FIG. 1. In the embodiment of the invention illustrated, this hook-on device includes the elements 12; another element 13 of the hook-on system is arranged to engage the elements 12, as can be seen from FIG. 1, and is connected to the tractor through hook-on bars 14, and a rod 15 of adjustable length.

The connection between the two frames 7 and 8 of the supporting structure of the mower is made by means of articulation means, such as two pivotable parallelogram mechanisms 16 and 17 described in detail later.

Each of the ends of the upper tube 9 of the frame 8 includes a gusset 18. Two shafts 19 extending horizontally and at right angles to the direction of advance A of the machine are welded onto each of the gussets 18, respectively. One end of each bar 21 and 22 extending rearwardly and downwardly is articulated or pivoted on each of the shafts 19 by means of a corresponding spherical articulating device 20, respectively. Each bar 21 and 22 is also articulated or pivoted at its other end by means of another spherical articulating device 20, best seen in FIG. 4, with a corresponding shaft 19 secured to a gusset 23 welded to the U-shaped frame 7.

The frame 7 to which the agricultural machine, such as the mower 1 is rigidly connected, is thus free to move upwardly and downwardly in relation to the frame 8 rigidly connected to the tractor. In addition, due to the spherical articulating means 20 provided at the ends of the bars 21 and 22 of the parallelogram mechanisms 16 and 17, the frame 7 is free to move laterally in each direction in relation to the frame 8, and vice-versa, in addition to movements in an upright direction, and in a direction opposite thereto. However, the lateral movements of the frame 7 in relation to frame 8 are limited by the amount of play j existing between the frames 7 and 8, as best seen in FIG. 2 As soon as the play j is taken up, the frame 7 comes to rest against the frame 8, so that the frames 7 and 8 then behave as one rigid assembly. Thus, when a change in the direction of movement is made by the tractor, the frame 8, for example, moves laterally until the play j is taken up. A corresponding lower part of a side member 10 then comes to rest against the inside of the U-shaped frame 7. At that moment the frame 8 bears on the frame 7 to block its path. As the articulating means 20 of the pivotable parallelogram mechanisms 16 and 17 are spherical articulating devices, the spherical articulating devices 20, together with their shafts 19 and the gussets 18 and 23, are not subjected to any stresses other than the pull of the mower 1.

Advantageously, the frame 8 is located above any active portions, such as the disks 2 of the mower. This makes it possible to locate the mower closer to the front wheels 11 of the tractor, and consequently to reduce the distance between the driver's place on the tractor, and the forward extremity of the machine, which is connected to the hooks of the tractor.

The frame 8 also carries an angle drive unit 24 powered by a driveshaft 25 connected to the power take-off 26 of the tractor. The angle drive unit 24, via a telescopic shaft 27 equipped with cardan or universal joints, drives a second angle drive unit 28 secured to the frame 7 above one of the outer disks 2 on the cutter bar 1. A (non-illustrated) shaft connects the angle drive unit 28 to the above-mentioned outer disk 2. In order to avoid any grass or fodder becoming entwined around that shaft, a drum 29 is welded to the outer disk 2, and extends upwardly practically up to the frame 7. The drum 29 also makes it possible to reduce the width of the windrow formed by the cutter bar 1, so that it can pass between the wheels of the tractor. For this same purpose, a drum 30 of a lower height than the height of the drum 29 is provided above the other outer disk 2 of the cutter bar 1.

The agricultural machine described above operates as follows: When the agricultural machine—in this case a mower employing disks 2—is hooked to the front of a tractor moving in the direction of advance A, the friction between the skids 31 of the casing 4 of the mower, and the terrain impedes the advance of the machine. This resistance to the advance of the machine tends to lift it from the ground, because it is suspended in the frame 8 by means of pivotable parallelogram mechanisms 16 and 17, whose bars 21 and 22 extend upwardly and forwardly, when viewed in the direction of advance A of the machine. The effect of the lift of the mower is to reduce its contact pressure with the terrain, and consequently to reduce resistance to the advance of the machine. As soon as that resistance is smaller than the traction force of the tractor, the agricultural machine will slide over the ground. If it encounters any obstacle, its resistance to the forward movement will increase, and it will be lifted above ground, making a rearward evasive movement in the process. Because of the spherical articulating means 20 incorporated in the bars of the parallelogram mechanisms 16, and 17, the amount of lift will vary, according to whether the machine meets an obstacle near its center, or near one of its extremities. If it meets an obstacle near one of its extremities, the machine will adopt an attitude forming a certain angle with the ground, which enables it to continue to cut the grass or fodder close to the ground near the side of its other extremity.

The spherical articulating means 20 of the bars 21 and 22 of the parallelogram mechanisms 16 and 17 also allow the mower to operate so that its plane facing the ground forms a certain angle with the part of the field over which the tractor is moving at that time. The mower can thus remain in close contact with the terrain over its entire cutting width, whatever the attitude of the tractor required for its use.

When the machine and the tractor are substantially operating in the same plane, it is preferable that the frame 7 to which the machine is connected, is well centered in relation to the frame 8 connected to the tractor. In principle, the two frames 7 and 8 should not bear one against the other. To this end, the articulating means, such as the pivotable joints 20 of at least one of the bars 21 or 22 of the parallelogram mechanisms 16, 17 are spaced further from one another on one of the frames than on the other frame. Thus, as can be seen in FIGS. 2 and 3, the distance L between the lower ends of the bars 22 of the parallelogram mechanisms 16 and 17 connected to frame 7 is greater than the distance 1 between the upper ends of the bars 22. Without departing from the bounds of the present invention, the bars 21 could be disposed in a similar manner. It is also possible to dispose the bars 21 and/or 22 in such a manner that the spacing 1 is greater than the spacing L. As a result, given the fact that the parallelogram mechanisms 16 and 17 are arranged to move upwardly and forwardly as viewed in the direction of advance A of the machine, the frame 8 tends to pull the frame 7, when the tractor is moving in the direction of the arrow A. The frame 7 then tends to center itself automatically in relation to the frame 8, so that a play j exists on either side of the frame 8, thus separating it from the frame 7.

Given that the frames 7 and 8 are connected by means of parallelogram mechanisms, the machine can rise or descend independently of the tractor, when it encounters an obstacle. To limit these movements or block the path of a portion of one frame with the respect to a portion of the other frame, it is possible to provide restraining means or stops 32 and 33 welded to the frame 7. Furthermore, when it is desired to raise the machine, so that it can travel on a road, the frames 7 and 8 may be connected to one another rigidly with the aid of (non-illustrated) pins passing into the frame 8 from below the frame 7. Thus, when the lifting device on the tractor, to which the frame 8 is rigidly connected, is operated, this will also lift the frame 7 together with the mower rigidly connected thereto.

Although the present invention has been described with reference to a mower hooked to the front of a tractor, it would be perfectly possible to replace the aforedescribed mower by another type of agricultural machine, without departing from the spirit of the present invention. Similarly, the device in accordance with the invention can also be hooked to the rear of a tractor, or to one side thereof.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A supporting structure for an agricultural machine, and connectable to a vehicle, movable in a first direction in a plane substantially parallel to the ground comprising in combination:
   a first frame adapted to be connected to the vehicle,
   a second frame adapted to be connected to the agricultural machine, and
   parallelogram means interconnecting said frames, and including spherical joints permitting movement therebetween in several directions, including an upright direction, a direction opposite thereto, in lateral directions substantially at right angles to said first and upright directions, and
   restraining means limiting the movement between said frames in said lateral directions, and including portions of said frames arranged to block the path of each other.

2. A supporting structure as claimed in claim 1, wherein one frame is at least partially disposed within the confines of the other frame.

3. A supporting structure as claimed in claim 1, wherein said first frame is U-shaped, and is at least partially disposed within the confines of said second frame.

4. A supporting structure as claimed in claim 1, wherein each frame defines substantially a dominant plane, said dominant planes being substantially perpendicular to one another.

5. A supporting structure as claimed in claim 1, wherein said first frame defines substantially a vertical plane, and said second frame defines substantially a horizontal plane in the operative positions of said frames, respectively.

6. A supporting structure as claimed in claim 1, wherein said pivotable parallelogram means includes two oppositely disposed pivotable parallelogram mechanisms, each having four pivotable joints, and wherein two pivotable joints of each parallelogram mechanism are connected to one frame, and the remaining two to the other frame, at least some of the pivotable joints of the oppositely disposed parallelogram mechanisms connected to said one frame being spaced from one another at a distance exceeding the spacing of the remaining pivotable joints of the oppositely disposed parallelogram mechanisms connected to the other frame.

* * * * *